(12) United States Patent  (10) Patent No.: US 7,574,786 B2
Cheng  (45) Date of Patent: Aug. 18, 2009

(54) STRING FASTENER

(75) Inventor: Sen-Mei Cheng, Chang Hwa Hsien (TW)

(73) Assignees: Taiwan Paiho Limited, Chang Hwa Hsien (TW); Chao-Nan Chang, Chang Hwa Hsien (TW)

( * ) Notice: Subject to any disclaimer, the term of this patent is extended or adjusted under 35 U.S.C. 154(b) by 427 days.

(21) Appl. No.: 11/640,852

(22) Filed: Dec. 19, 2006

(65) Prior Publication Data

US 2008/0034555 A1 Feb. 14, 2008

(30) Foreign Application Priority Data

Aug. 9, 2006 (TW) .............................. 95129256 A

(51) Int. Cl.
  A43C 7/00 (2006.01)
(52) U.S. Cl. ................... 24/712.5; 24/115 G; 24/712.2; 36/50.1
(58) Field of Classification Search ................... None
  See application file for complete search history.

(56) References Cited

U.S. PATENT DOCUMENTS

| 2,893,090 | A | * | 7/1959 | Pagoda ....................... 24/712.2 |
| 3,080,867 | A | * | 3/1963 | Eichinger ................... 606/203 |
| 4,336,636 | A | * | 6/1982 | Ishiguro et al. .......... 24/115 M |
| 4,393,550 | A | * | 7/1983 | Yang et al. ................ 24/712.5 |
| 5,263,232 | A | * | 11/1993 | Matoba ..................... 24/115 G |
| 5,649,340 | A | * | 7/1997 | Ida ........................... 24/115 G |
| 6,126,237 | A | * | 10/2000 | Ritterhouse ................ 297/397 |
| 6,178,606 | B1 | * | 1/2001 | Glendon ..................... 24/712.5 |
| 6,510,627 | B1 | * | 1/2003 | Liu .............................. 36/50.1 |
| 6,568,048 | B2 | * | 5/2003 | Liu ............................ 24/712.2 |
| 6,718,602 | B1 | * | 4/2004 | Chang ....................... 24/712.1 |
| 7,124,482 | B2 | * | 10/2006 | Kim .......................... 24/712.1 |
| 7,152,285 | B2 | * | 12/2006 | Liao .......................... 24/712.5 |
| 2006/0130297 | A1 | * | 6/2006 | Liao .......................... 24/712.5 |

* cited by examiner

Primary Examiner—Jack W. Lavinder
(74) Attorney, Agent, or Firm—Muncy, Geissler, Olds & Lowe, PLLC

(57) ABSTRACT

A string fastener including a fastener body and two positioning units is provided. The fastener body has two first holes and two sliding tracks. The first holes are defined completely through a top to a bottom of the fastener body. The sliding tracks are respectively defined in the opposite sides, extended toward a bar portion, forming between the first holes, and communicated with the first holes. The positioning units respectively have a bulge, an opening, an indentation and an operating portion. The bulge can be held in the first holes to locate the positioning unit. A block portion is formed between the opening and the indentation. The operating portion is connected to the positioning unit body outside the fastener body. Therefore, multiple spaces for the string to pass through are provided with the block portions of the position units and the bar portion of the fastener body.

17 Claims, 13 Drawing Sheets

STRING FASTENER

RELATED APPLICATIONS

The present application is based on, and claims priority from, Taiwan Application Serial Number 95129256, filed Aug. 9, 2006, the disclosure of which is hereby incorporated by reference herein in its entirety.

BACKGROUND

1. Field of Invention

The present invention relates to a fastener, and more particularly to a string fastener for a person to secure the string.

2. Description of Related Art

With using conventional shoelace, a person who wears shoes must tighten the shoelace to prevent the shoelace from being loosed. Otherwise, the person may trip over the loosed shoelace and the potential hazard may occur. Thus, the person needs to squat down to tie the loosed shoelace again. However, tying the loosed shoelace in crowd or during exercise takes time and is also inconvenient for the person. As a result, a fastener for securing the shoelace has been developed.

The conventional shoelace fastener is a spring-biased structure. This fastener comprises a plastic sheet and a spring. The spring pushes the plastic sheet against the shoelace with the fastener case to hold the shoelace in position. Therefore, the tightening and positioning effects are generated.

However, the user needs to spend much strength to against the elasticity of the spring when the elasticity is large. Correspondingly, the tightening and positioning effects are reduced when the elasticity is small. When the spring force is weak, relative slipping may occur between the shoelace and the plastic sheet if the fastener is pulled or drew. Therefore, an enhanced shoelace fastener is required to overcome the poor positioning of the conventional spring shoelace fastener.

SUMMARY

It is therefore an objective of the present invention to provide a string fastener to solve the poor positioning effect of the conventional spring shoelace fastener.

A string fastener including a fastener body and two positioning units is provided. The fastener body has a top, a bottom, a first side, a second side, a third side, a fourth side, a protrusion, two first holes, a bar portion and two sliding tracks. The first side is opposite to the second side and the third side is opposite to the fourth side. The protrusion is located on the fourth side. The first holes are defined completely through the top to the bottom. The bar portion is formed between the first holes. The sliding tracks are respectively defined in the first side and the second side, extended toward the bar portion and communicated respectively with the first holes. Furthermore, the positioning units are slidably and respectively held in the fastener body along the sliding tracks. Each of the positioning units has a positioning unit body, a bulge, an opening, an operating portion, an indentation and a block portion. The positioning unit body is slidably held in the fastener body along the associated sliding track. The bulge is protruded downward from the positioning unit body and held in the associated first holes in the bottom of the fastener body. The opening is defined in the positioning unit body. The operating portion is connected to the positioning unit body outside the fastener body. The indentation is defined in a position opposite to the operating portion. The block portion is formed between the opening and the indentation. Therefore, multiple spaces, provided for the string to pass through, are defined by the positioning unit and the fastener body.

In addition, the string fastener further includes a section and a cover. The section is mounted to the bottom and protruded from the third side and has three second holes aligned in parallel to the first holes in the top of the fastener body. The cover housing the fastener body has three apertures, a groove and a decoration portion. The apertures of the cover corresponds to the second holes of the section to define multiple spaces for the string to pass through. The groove corresponds to and is engaged with the protrusion of the fastener body. The decoration portion is formed on the cover and may include trademarks, patterns, words or various shapes made by printing, sticker or transferring.

As a result, the string is firmly fastened with the positioning unit held in the fastener body. Furthermore, the user can take advantage of the operating portion to appropriately adjust the positioning unit such that the shoelace can be passed through the hole smoothly.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 6 is a top view of the fastener when the positioning units are pulled outward to make the lace passed through;

DESCRIPTION OF THE PREFERRED EMBODIMENTS

Figure 1:
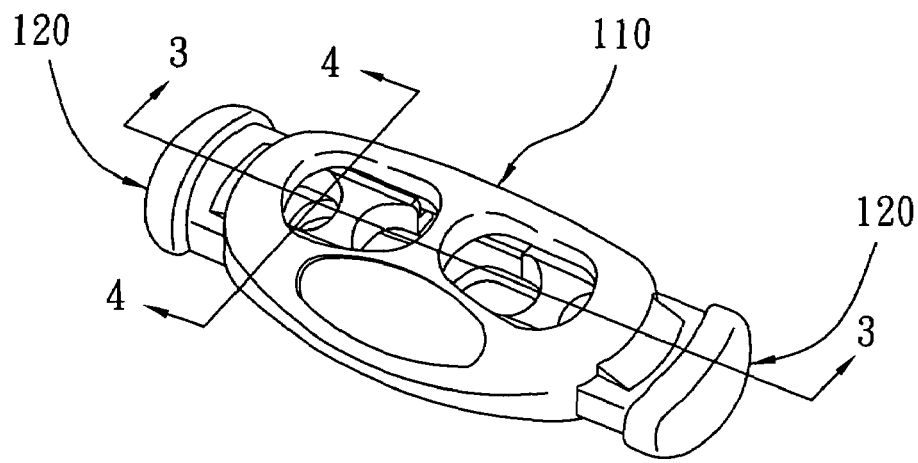
FIG. 1 is a perspective view of a first embodiment of the string fastener in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 2:
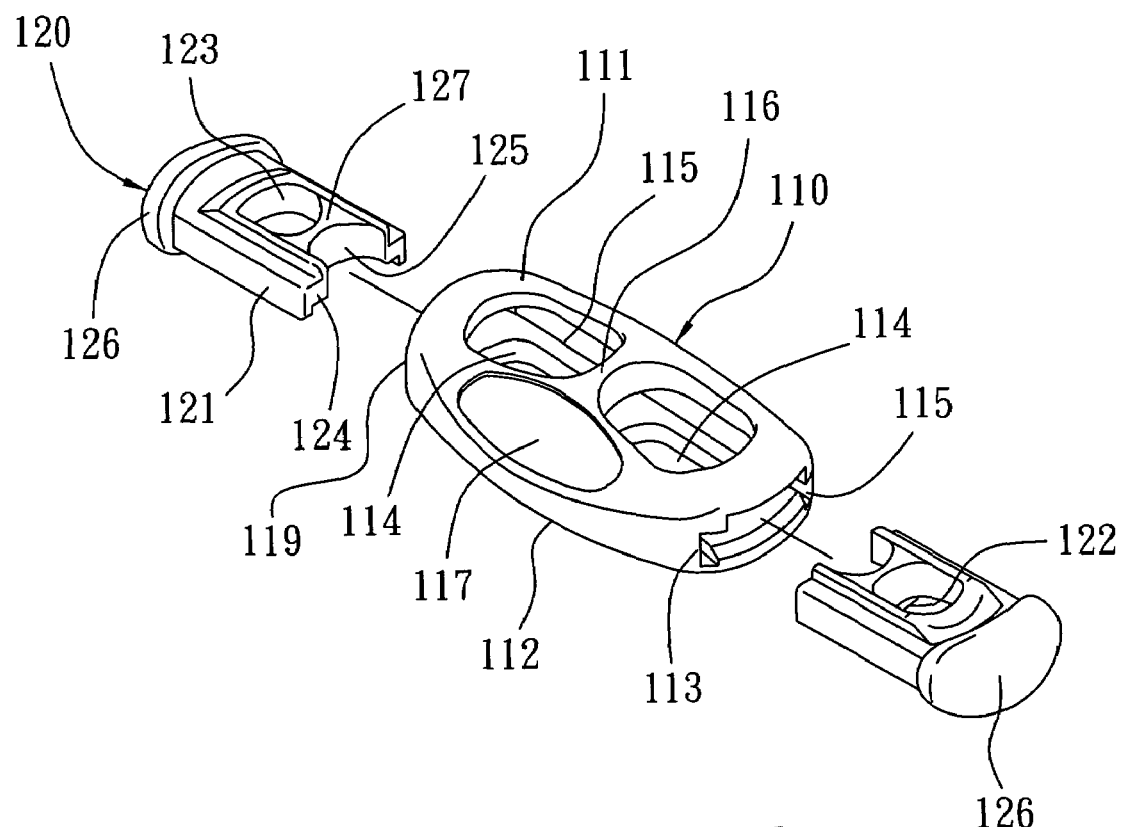
FIG. 2 is an exploded perspective view in accordance with FIG. 1.
Figure 3:
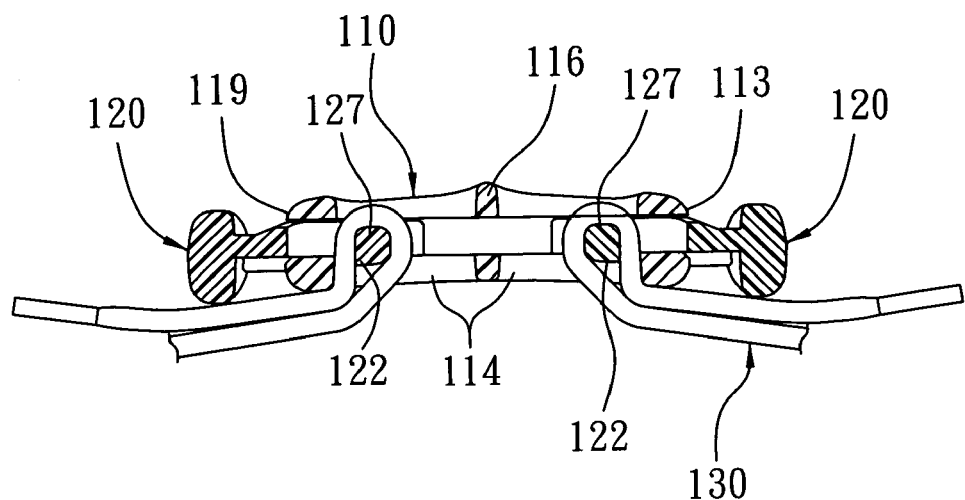
FIG. 3 is a sectional view along the section line 3-3 in FIG. 1.

Refer to FIG. 1, FIG. 2 and FIG. 3. FIG. 1 and FIG. 2 are respectively a perspective view and an exploded perspective view of the first embodiment of the string fastener in accordance with the present invention. FIG. 3 is a sectional view along the section line 3-3 in FIG. 1.

The string fastener of the first embodiment includes a fastener body 110 and two positioning units 120. The fastener body 110 has a top 111, a bottom 112, a first side 119, a second side 113, two first holes 114, two sliding tracks 115 and a bar portion 116. The first side 119 is opposite to the second side 113. The first holes 114 are defined completely through the top 111 to the bottom 112. The bar portion 116 is formed between the first holes 114. The sliding tracks 115 are respectively defined in the side 113 and the side 119 of the fastener body 110, extended toward the bar portion 116 and communicated respectively with the first holes 114. The first holes 114 are elongated holes. Moreover, the fastener body 110 further includes a decoration portion 117 formed on the top 111. The decoration portion 117 may include trademarks, patterns, words or various shapes made by printing, sticker or transferring.

Figure 4:
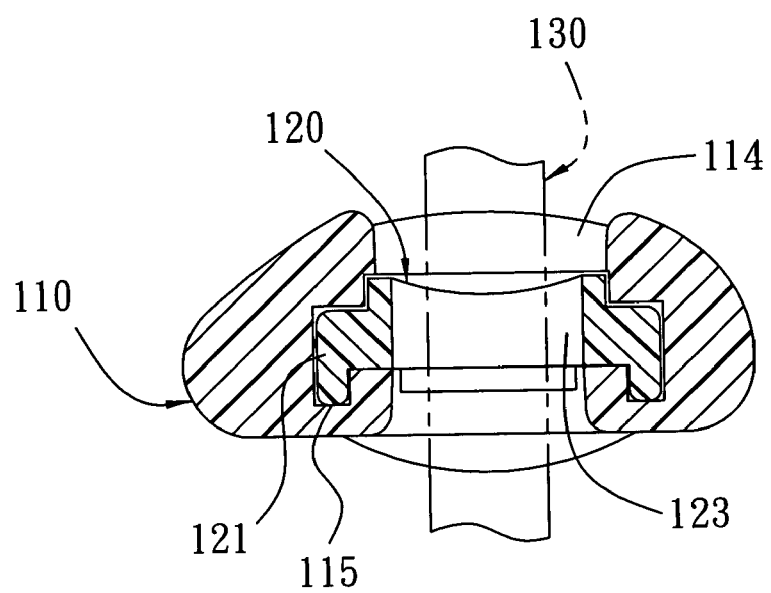
FIG. 4 is a sectional view along the section line 4-4 in FIG. 1.

Refer to FIG. 2, FIG. 3 and FIG. 4. FIG. 4 is a sectional view along the section line 4-4 in FIG. 1.

The positioning units 120 respectively have a positioning unit body 121, a bulge 122, an opening 123, an indentation 125, an operating portion 126 and a block portion 127. The positioning units 120 are respectively and slidably held in the fastener body 110 at the sides. The positioning unit body 121 is slidably held in the fastener body 110 along the sliding track 115. The bulge 122 is protruded downward from the positioning unit body 121 and can be movably retained in the first hole 114 of the fastener body 110 when the positioning unit 120 is pushed inward or pulled outward relative to the fastener body 110. Thus, the bulge 122 prevents the positioning unit 120 from being completely pulled out of the fastener body 110.

The opening 123 is defined in the positioning unit body 121. The indentation 125 is defined in an end 124, opposite to the operating portion 126, of the positioning unit body 121. The operating portion 126 is extended outward and can be retained with the fastener body 110. The block portion 127 is formed between the opening 123 and the indentation 125. Therefore, a shoelace 130 can pass through the fastener body 110 with the corresponding relation of the first holes 114, the openings 123 and the indentations 125.

Figure 5:
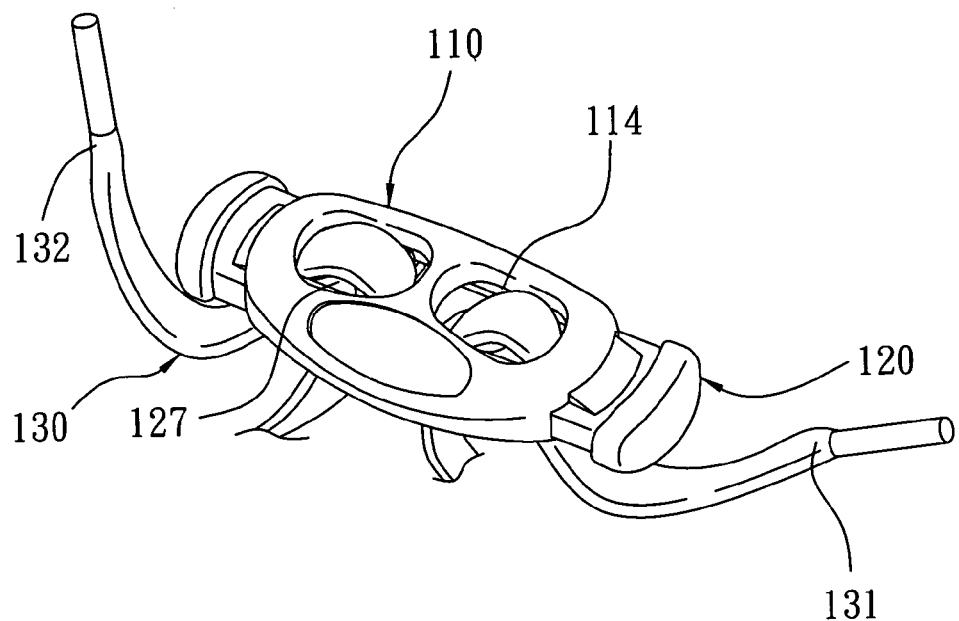
FIG. 5 is an operational perspective view of the first embodiment combined with the shoelace.

Refer to FIG. 3, FIG. 4 and FIG. 5. FIG. 5 is a perspective view of the first embodiment combined with the shoelace 130.

A terminal 131 of the shoelace 130 passes through the first hole 114 in the bottom 112 and the indentation 125, wraps partly around the block portion 127, and eventually passes through the first hole 114 to be out of the fastener body 110. Likewise, another terminal 132 of the shoelace 130 is partly wrapped around the other block portion 127. By this method, the shoelace 130 is operable to pass through the fastener body 110 to be fastened.

Figure 6:
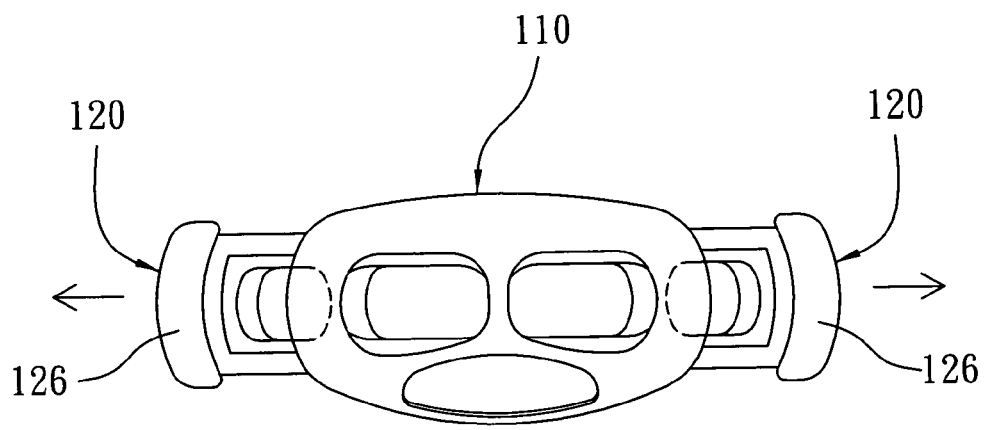
Figure 7:
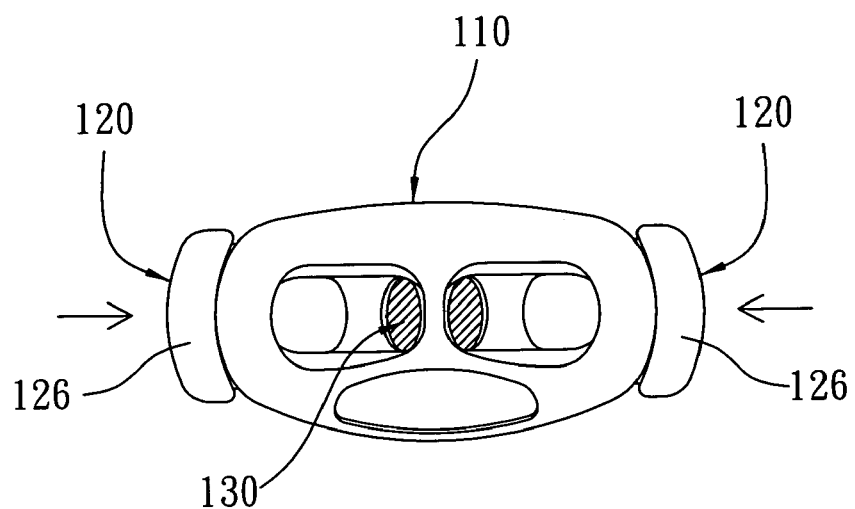
FIG. 7 is a top view of the fastener when the positioning units are pushed inward to firmly hold the lace in position.
Figure 8:
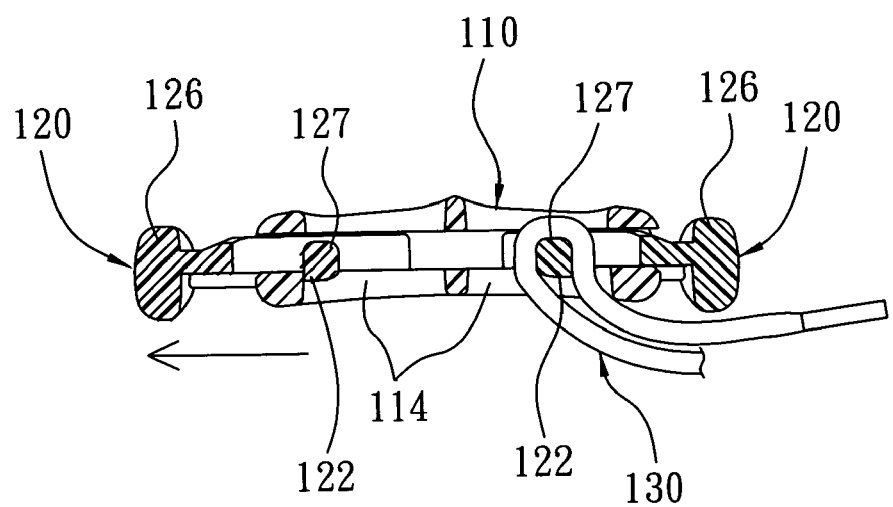
FIG. 8 is a sectional view illustrating the bulge is retained by the wall of the first hole.

Refer to FIG. 6, FIG. 7 and FIG. 8. FIG. 6 is a top view of the fastener when the positioning units are pulled outward to make the lace passed through. FIG. 7 is a top view of the fastener when the positioning units are pushed inward to firmly hold the lace in position. FIG. 8 is a sectional view illustrating the bulge is retained by the wall of the first hole.

The operating portion 126, which can be retained with the fastener body 110, is used to appropriately adjust the positioning unit 120 such that the shoelace can be passed through the hole smoothly. Besides, the bulge 122 of the positioning unit 120 can be retained by the first hole 114 in the bottom 112 such that the positioning unit 120 cannot be separated from the sliding track 115. Thus, the user pulls the operating portion 126 to pass the shoelace 130 through the indentations 125 and the first holes 114 and then pushes the operating portion 126 to pass the shoelace 130 through the openings 123 and first holes 114. In this way, the shoelace 130 is fastened firmly via the fastener body 110 and the positioning unit 120.

Figure 9:
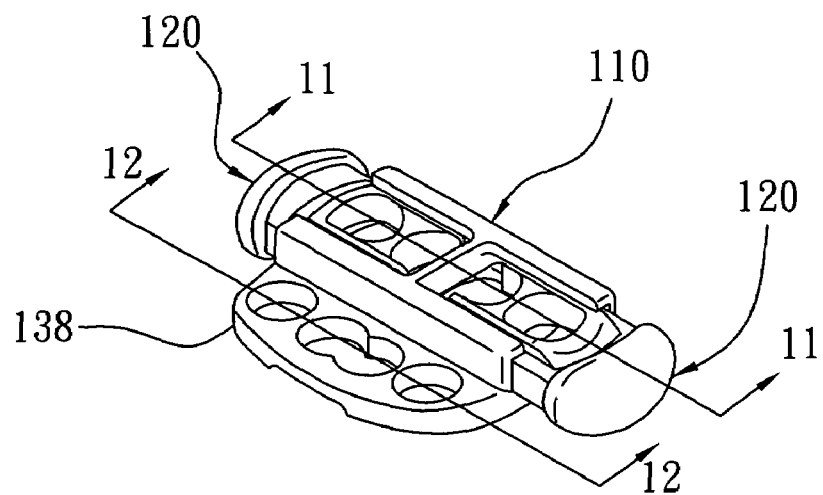
FIG. 9 is a perspective view of a second embodiment of the string fastener in accordance with the present invention.
Figure 10:
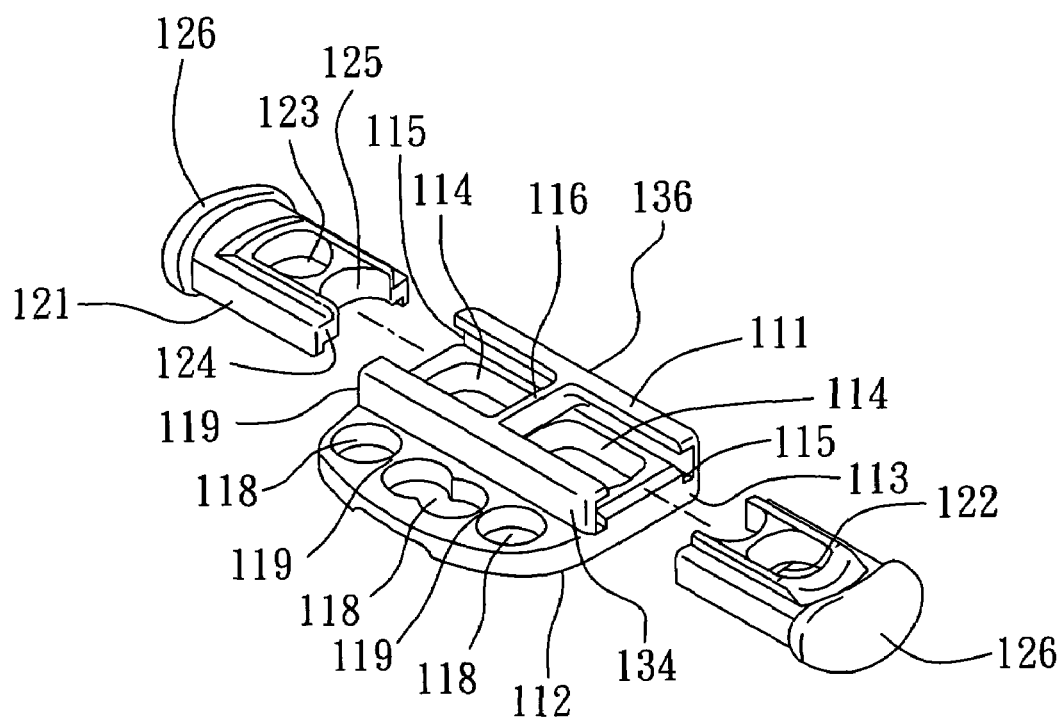
FIG. 10 is an exploded perspective view in accordance with FIG. 9.

Refer to FIG. 9 and FIG. 10. FIG. 9 and FIG. 10 are respectively a perspective view and an exploded perspective view of the second embodiment of the string fastener in accordance with the present invention.

In the second embodiment, the fastener body 110 further includes a third side 134. The difference between the first embodiment and the second embodiment is that the fastener body 110 further includes a section 138 mounted to the bottom 112 and protruded from the third side 134. The first holes 114 in the top 111 are modified with recesses. The section 138 has three second holes 118 arranged in parallel to the first holes 114 and two separation portions 119 formed between the second holes 118. The middle second hole 118 has a neck to contain two slips of the shoelace and holds each of the slips.

Figure 11:
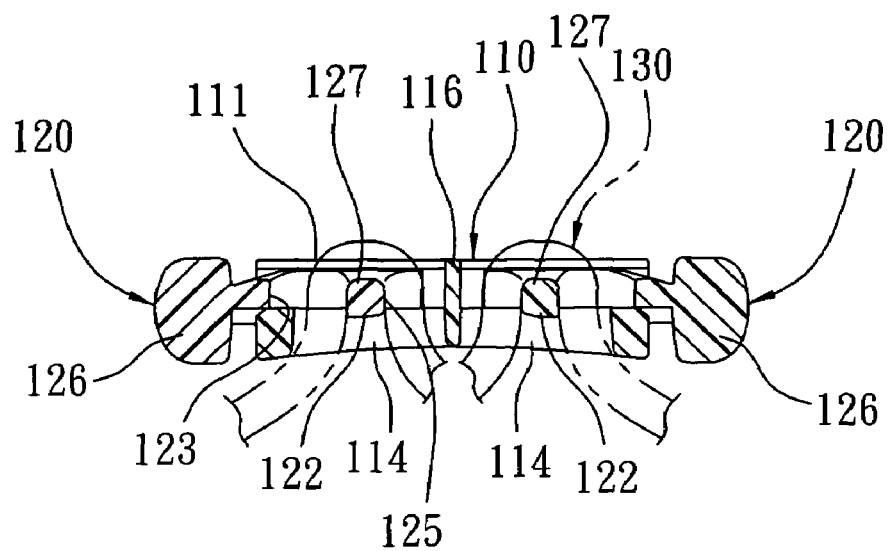
FIG. 11 is a sectional view along the section line 11-11 in FIG. 9.
Figure 12:
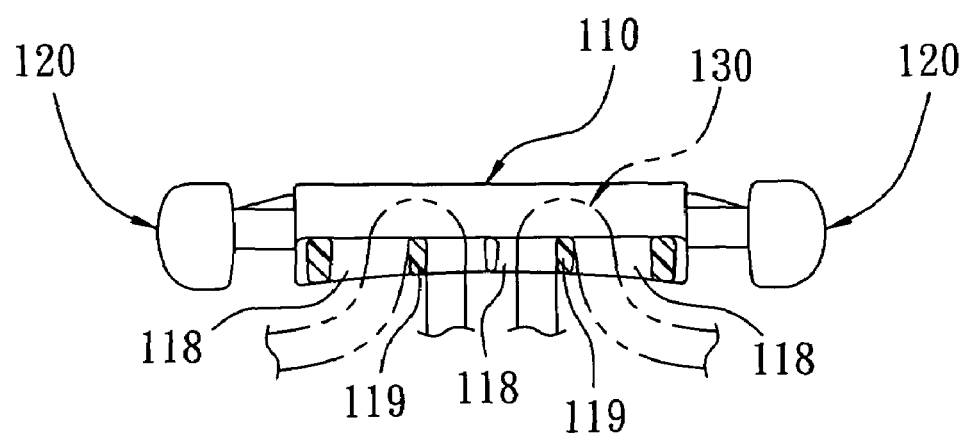
FIG. 12 is a sectional view along the section line 12-12 in FIG. 9.
Figure 13:
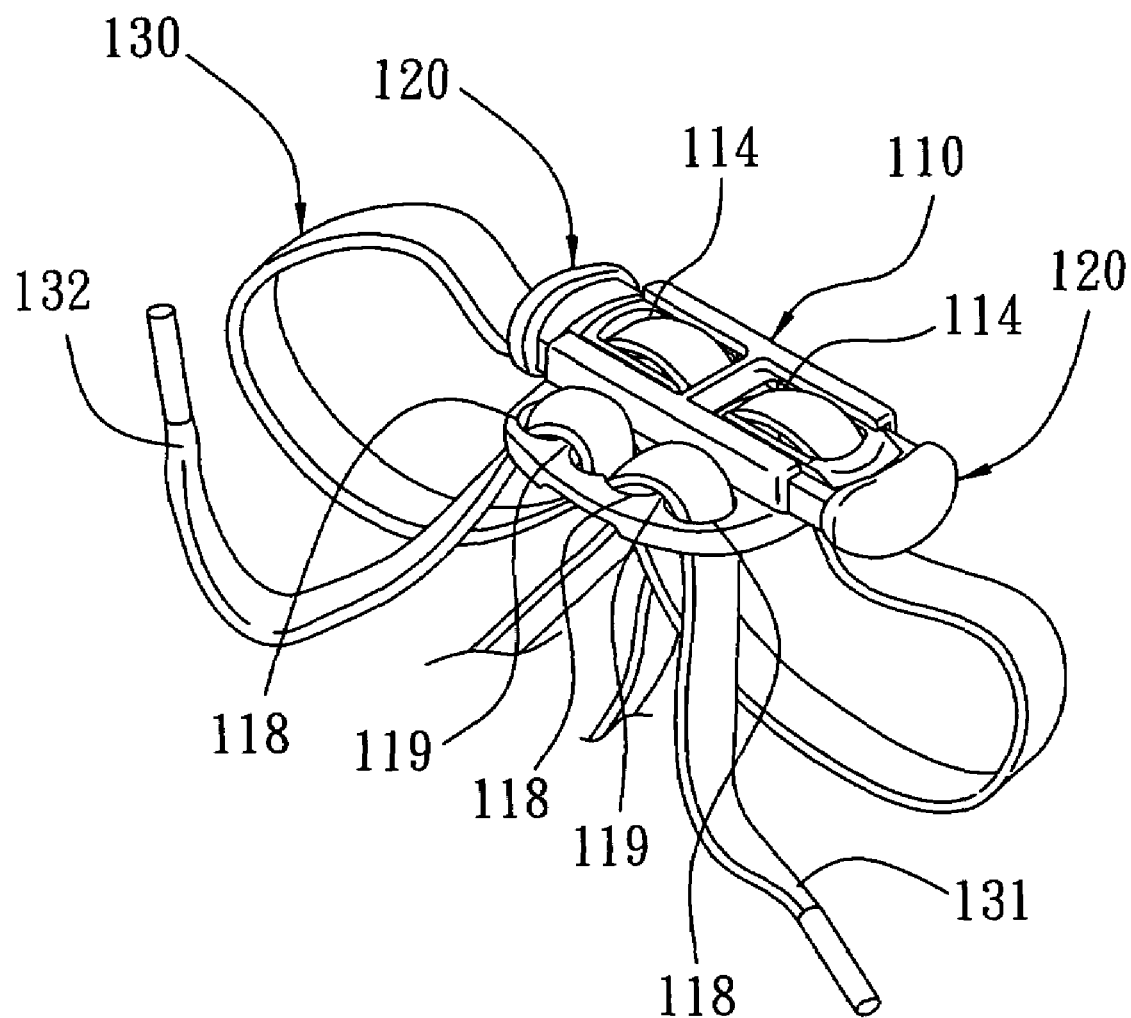
FIG. 13 is a perspective view of the second embodiment combined with the shoelace.

Refer to FIG. 11, FIG. 12 and FIG. 13. FIG. 11 is a sectional view along the section line 11-11 in FIG. 9. FIG. 12 is a sectional view along the section line 12-12 in FIG. 9. FIG. 13 is a perspective view of the second embodiment combined with the shoelace 130.

After the shoelace 130 passes through the fastener body 110 and the positioning units 120 (the same method of the first embodiment), the terminal 131 and the terminal 132 pass upward the middle second hole 118 and then respectively crossed the opposite separation portions 119 to pass through the opposite second holes 118 to form a bowknot.

Figure 14:
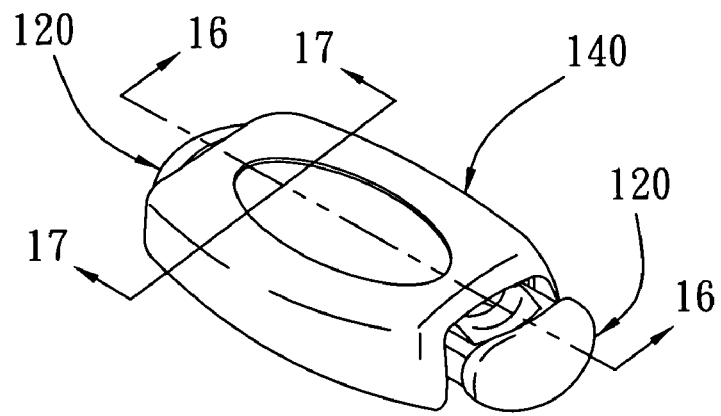
FIG. 14 is a perspective view of a third embodiment of the string fastener in accordance with the present invention.
Figure 15:
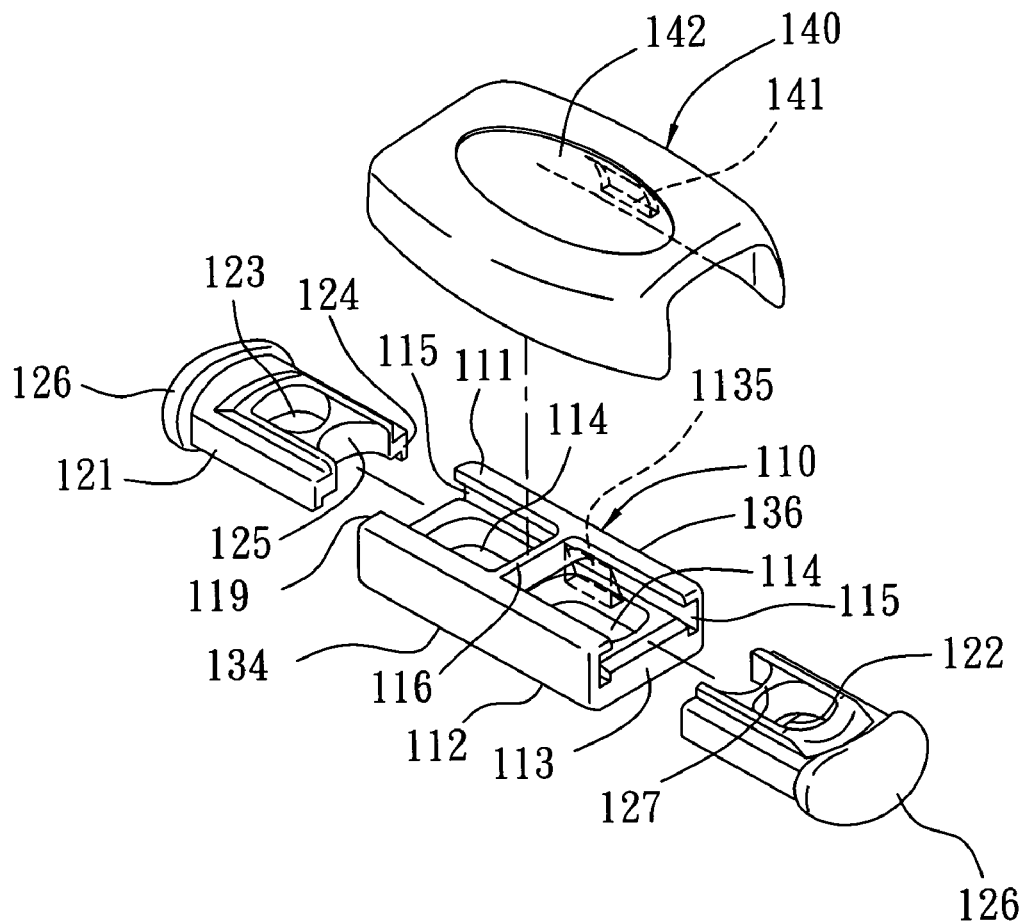
FIG. 15 is an exploded perspective view in accordance with FIG. 14.
Figure 16:
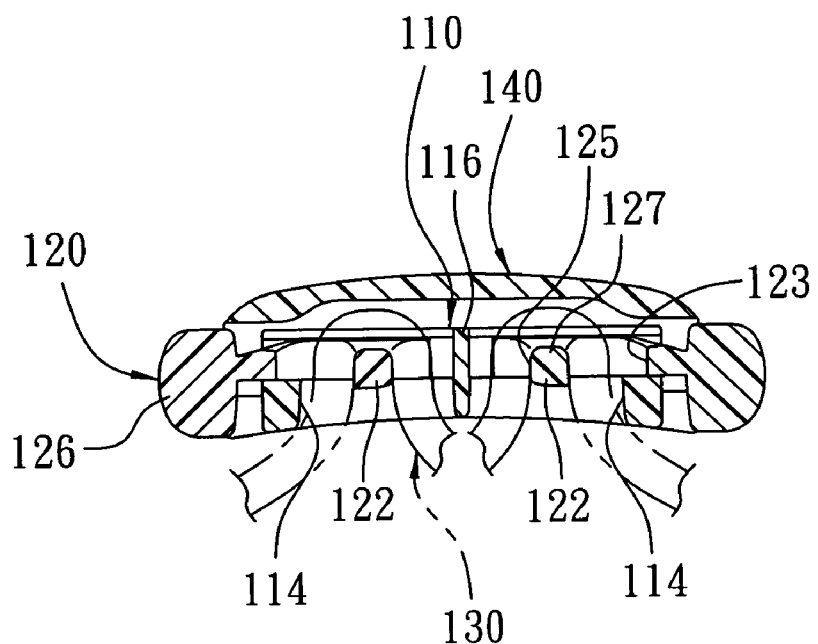
FIG. 16 is a sectional view along the section line 16-16 in FIG. 14.

Refer to FIG. 14, FIG. 15 and FIG. 16. FIG. 14 and FIG. 15 are respectively a perspective view and an exploded perspective view of the third embodiment of the string fastener in accordance with the present invention. FIG. 16 is a sectional view along the section line 16-16 in FIG. 14.

The difference between the first embodiment and the third embodiment is the string fastener further includes a cover 140 housing the fastener body 110 and the fastener body 110 further includes a fourth side 136 and a protrusion 1135. The first holes 114 in the top 111 are modified with recesses. The protrusion 1135 is located on the fourth side 136. The cover 140 houses the top 111 of the fastener body 110. The cover 140 has a groove 141 and a decoration portion 142. The groove 141 can be engaged with the protrusion 1135 of the fastener body 110 and the decoration portion 142 is formed on the cover 140. The decoration portion 142 may include trademarks, patterns, words or various shapes made by printing, sticker or transferring.

Figure 17:
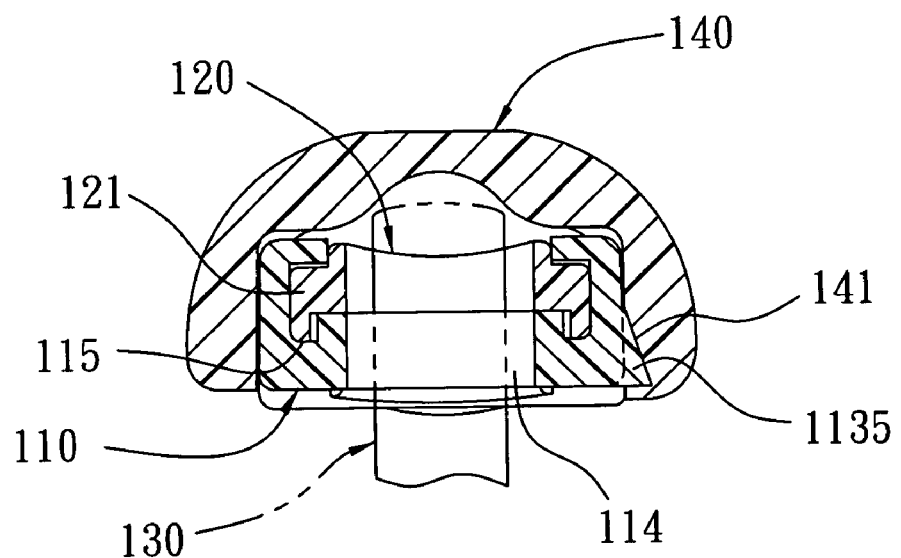
FIG. 17 is a sectional view along the section line 17-17 in FIG. 14.
Figure 18:
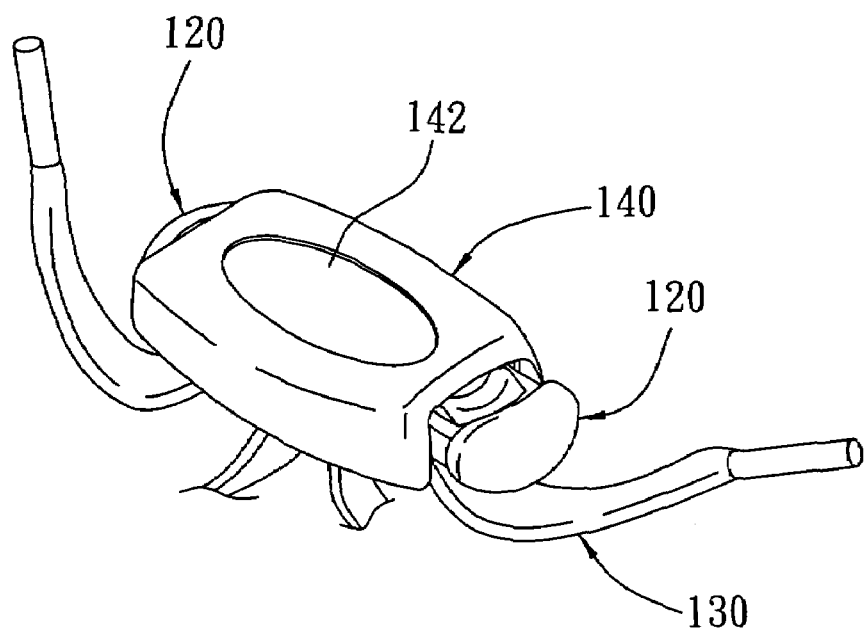
FIG. 18 is a perspective view of the third embodiment combined with the shoelace.

Refer to FIG. 17 and FIG. 18. FIG. 17 is a sectional view along the section line 17-17 in FIG. 14. FIG. 18 is a perspective view of the third embodiment combined with the shoelace 130.

The method for setting the shoelace 130 of the third embodiment is the same as the method of the first embodiment, so detailed description as previously described is not provided. After setting the shoelace 130, the cover 140 houses the fastener body 110 to make the protrusion 1135 being engaged with the groove 141. The shoelace 130 fastened in the first holes 114 is hidden by the cover 140 and the decoration portion 142 displays the trademark, words or patterns to provide an aesthetic effect.

Figure 19:
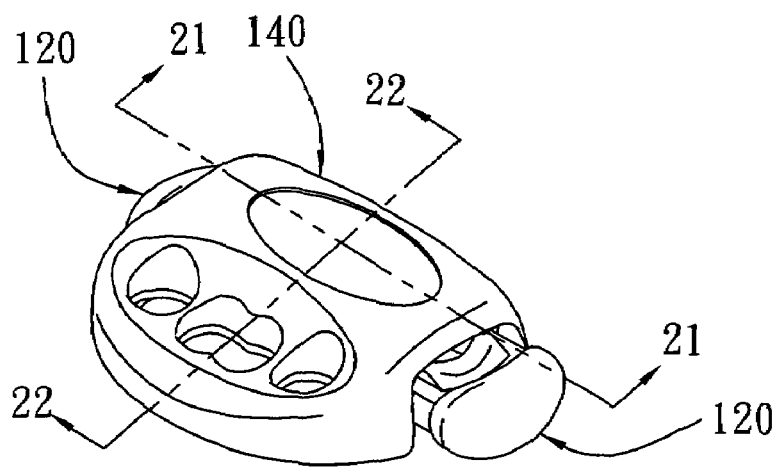
FIG. 19 is a perspective view of the fourth embodiment of the string fastener in accordance with the present invention.
Figure 20:
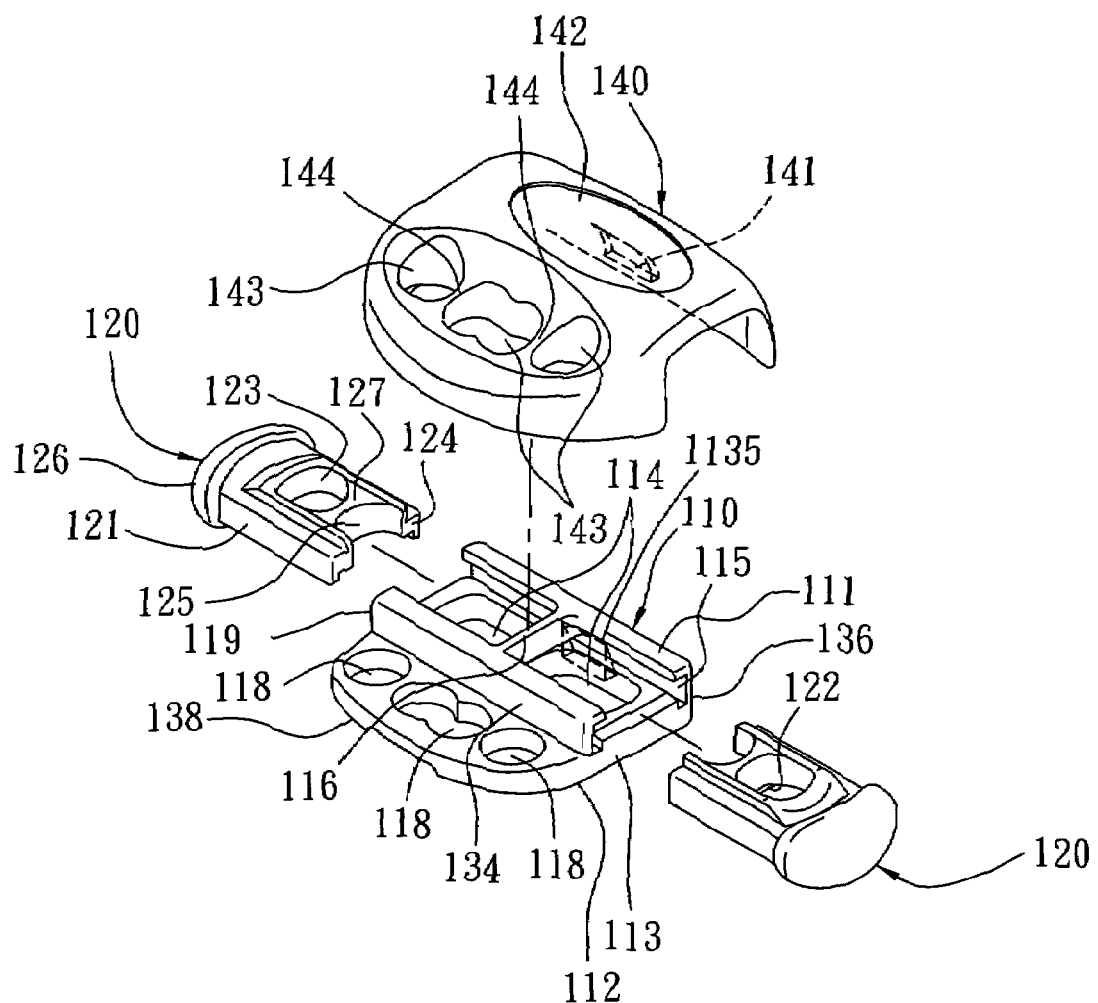
FIG. 20 is an exploded perspective view in accordance with FIG. 19.
Figure 21:
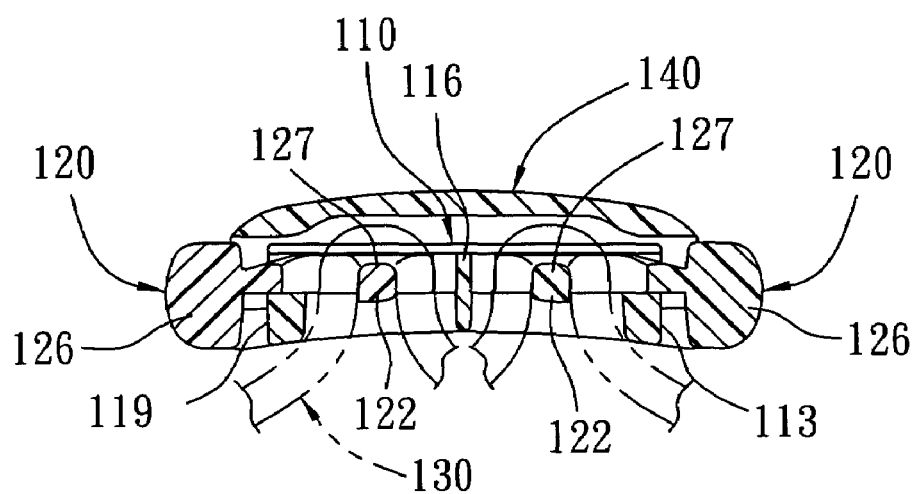
FIG. 21 is a sectional view along the section line 21-21 in FIG. 19.

Refer to FIG. 19, FIG. 20 and FIG. 21. FIG. 19 and FIG. 20 are respectively a perspective view and an exploded perspective view of the fourth embodiment of the string fastener in accordance with the present invention. FIG. 21 is a sectional view along the section line 21-21 in FIG. 19.

The difference between the second embodiment and the fourth embodiment is the string fastener further includes a cover 140 housing the fastener body 110 and the fastener body 110 further includes a fourth side 136 and a protrusion 1135. The protrusion 1135 is located on the fourth side 136.

The cover 140 houses the top 111 of the fastener body 110. The cover 140 has a groove 141, a decoration portion 142 and three apertures 143. The groove 141 corresponds to and can be engaged with the protrusion 1135 of the fastener body 110. The decoration portion 142 is formed on the cover 140. The apertures 143 corresponds to the second holes 118 and two separation portions 144 are set between the apertures 143.

Figure 22:
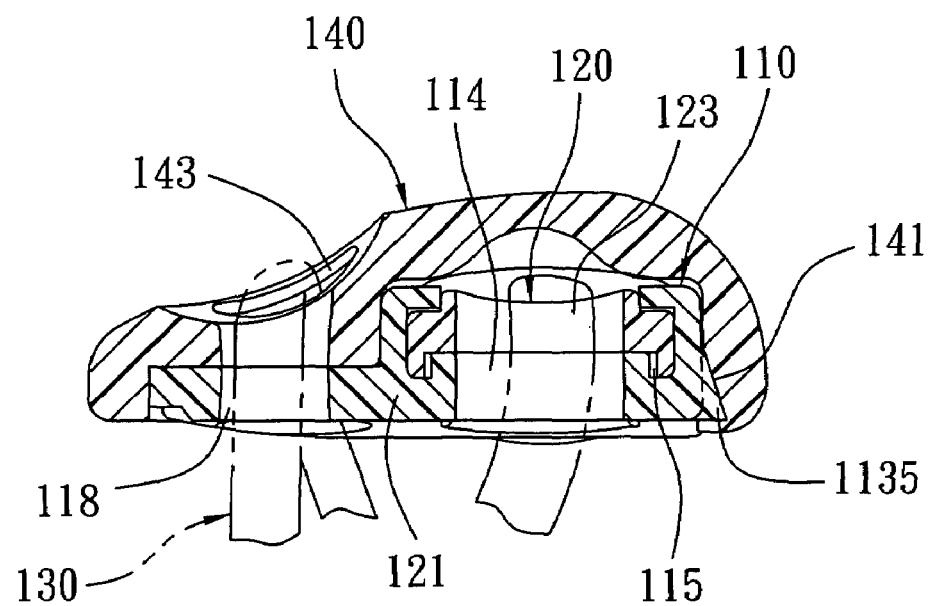
FIG. 22 is a sectional view along the section line 22-22 in FIG. 19.
Figure 23:
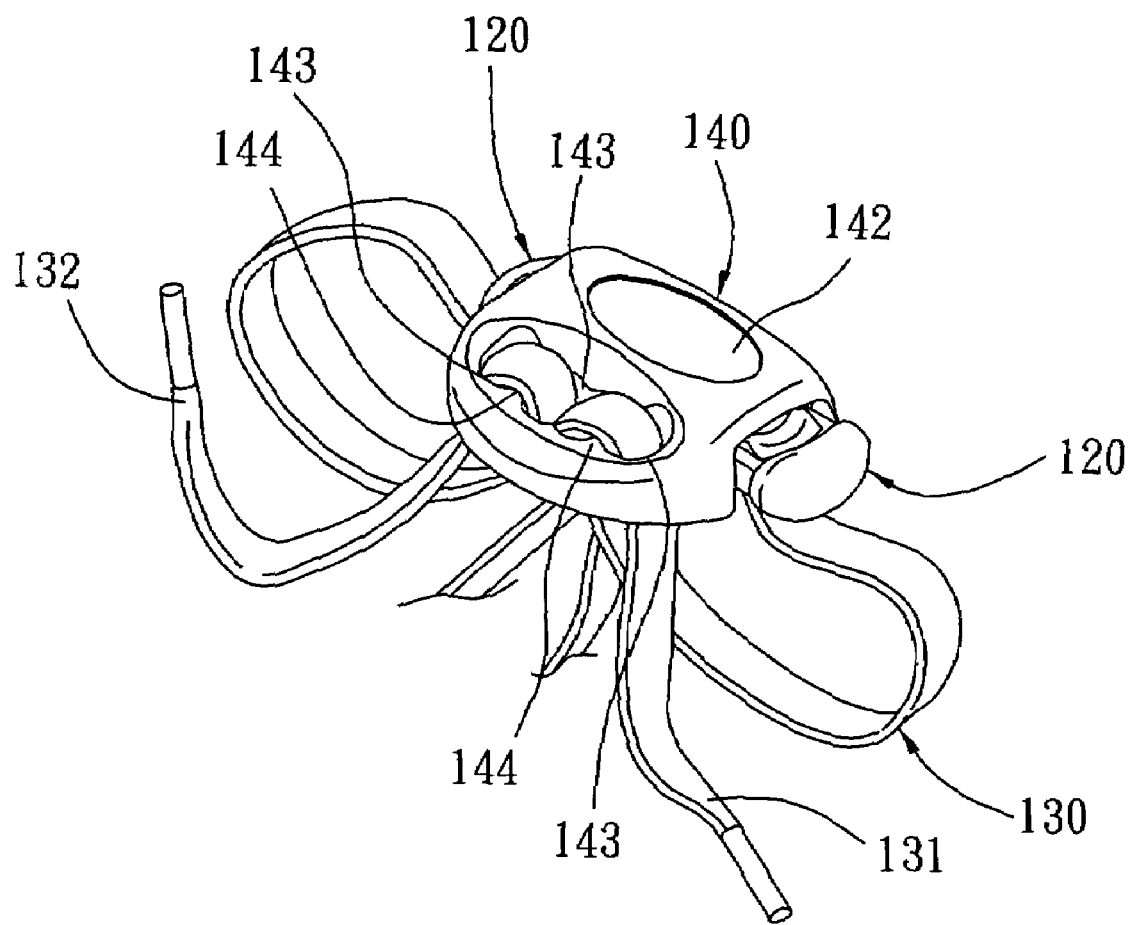
FIG. 23 is a perspective view of the fourth embodiment combined with the shoelace.

Refer to FIG. 21, FIG. 22 and FIG. 23. FIG. 22 is a sectional view along the section line 22-22 in FIG. 19. FIG. 23 is a perspective view of the fourth embodiment combined with the shoelace.

After the shoelace 130 is passed through the fastener body 110 and the positioning units 120 (the same method of the first embodiment), the terminal 131 and the terminal 132 pass upward the middle second hole 118 and the middle aperture 143, and then respectively crossed the opposite separation portions 144 to pass through the opposite aperture 143 and the second hole 118 to form a bowknot. After setting the shoelace 130, the cover 140 houses the fastener body 110 to make the protrusion 1135 being engaged with the groove 141.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A string fastener for fastening a string, comprising:
    a fastener body including
        a top;
        a bottom;
        a first side;
        a second side opposite to the first side;
        a third side;
        two first holes defined completely through the top to the bottom;
        a bar portion formed between the first holes; and
        two sliding tracks respectively defined in the first side and the second side, extended toward the bar portion and communicated respectively with the first holes; and
    two positioning units slidably and respectively held in the fastener body along the sliding tracks, and each of the positioning units comprising
        a positioning unit body slidably held in the fastener body along the associated sliding track;
        a bulge protruded downward from the positioning unit body and held in the associated first hole in the bottom of the fastener body;
        an opening defined in the positioning unit body;
        an operating portion connected to the positioning unit body outside the fastener body;
        an indentation defined in a position opposite to the operating portion; and
        a block portion formed between the opening and the indentation.

2. The string fastener of claim 1, further comprising a section mounted to the bottom and protruded from the third side.

3. The string fastener of claim 2, wherein the section includes three second holes aligned in parallel to the first holes in the top of the fastener body.

4. The string fastener of claim 3, wherein the second holes comprises a middle second hole that has a neck to restrict two segments of the string held in the middle second hole.

5. The string fastener of claim 1, wherein the first holes are elongated holes.

6. The string fastener of claim 1, wherein the opening of the positioning unit is circular.

7. The string fastener of claim 1, wherein the indentation of the positioning unit is an arc.

8. The string fastener of claim 1, further comprising a decoration portion formed on the top.

9. A string fastener for fastening a string, comprising:
    a fastener body comprising
        a top;
        a bottom;
        a first side;
        a second side opposite to the first side;
        a third side;
        a fourth side opposite to the third side;
        a protrusion located on the fourth side;
        two first holes defined completely through the top to the bottom;
        a bar portion formed between the first holes; and
        two sliding tracks respectively defined in the first side and the second side, extended toward the bar portion and communicated respectively with the first holes;
    two positioning units slidably and respectively held in the fastener body along the sliding tracks, and each of the positioning units comprising
        a positioning unit body slidably held in the fastener body along the associated sliding track;
        a bulge protruded downward from the positioning unit body and held in the associated first hole in the bottom of the fastener body;
        an opening defined in the positioning unit body;

an operating portion connected to the positioning unit body outside the fastener body;

an indentation defined in a position opposite to the operating portion; and a block portion formed between the opening and the indentation; and a cover housing the fastener body and comprising a groove corresponding to and engaged with the protrusion of the fastener body.

10. The string fastener of claim 9, further comprising a section mounted to the bottom and protruded from the third side.

11. The string fastener of claim 10, wherein the section includes three second holes aligned in parallel to the first holes in the top of the fastener body.

12. The string fastener of claim 11, wherein the second holes comprise a middle second hole that has a neck to restrict two segments of the string held in the middle second hole.

13. The string fastener of claim 12, wherein the cover includes three apertures respectively corresponding to the second holes of the section.

14. The string fastener of claim 9, wherein the first holes are elongated holes.

15. The string fastener of claim 9, wherein the opening of the positioning unit is circular.

16. The string fastener of claim 9, wherein the indentation of the positioning unit is an arc.

17. The string fastener of claim 9, wherein the cover further comprises a decoration portion formed on the cover.

* * * * *